US006761822B1

(12) United States Patent
Rhyne et al.

(10) Patent No.: US 6,761,822 B1
(45) Date of Patent: Jul. 13, 2004

(54) DUAL FILTER WITH FLOW MIXER AND CENTRIFUGAL SEPARATOR

(75) Inventors: Gregory Keith Rhyne, Denver, NC (US); Mark Allen Roll, Bessemer City, NC (US); Willie Luther Stamey, Jr., Kings Mountain, NC (US); Johnny Wong, Gaston, NC (US)

(73) Assignee: Dana Corporation, Toledo, OH (US)

( * ) Notice: Subject to any disclaimer, the term of this patent is extended or adjusted under 35 U.S.C. 154(b) by 177 days.

(21) Appl. No.: 10/035,439

(22) Filed: Jan. 4, 2002

Related U.S. Application Data

(63) Continuation-in-part of application No. 09/474,061, filed on Dec. 29, 1999, now Pat. No. 6,350,379, and a continuation-in-part of application No. 09/398,459, filed on Sep. 17, 1999, now Pat. No. 6,423,225.

(51) Int. Cl.$^7$ .......................... B01D 21/26; B01D 27/14; B01D 35/22

(52) U.S. Cl. .................... 210/323.2; 210/253; 210/254; 210/305; 210/307; 210/314; 210/316; 210/319; 210/320; 210/323.1; 210/407; 210/440; 210/443; 210/DIG. 13; 210/DIG. 17

(58) Field of Search ................................. 210/168, 253, 210/254, 304, 305, 306, 307, 314, 316, 319, 320, 323.1, 407, 440, 443, DIG. 13, DIG. 17, 437, 323.2

(56) References Cited

U.S. PATENT DOCUMENTS

| | | | |
|---|---|---|---|
| 3,078,650 A | 2/1963 | Anderson et al. | |
| 3,272,336 A | 9/1966 | Humbert, Jr. | |
| 3,397,786 A | 8/1968 | Hultgren | |
| 3,508,383 A | 4/1970 | Humbert, Jr. et al. | |
| 3,586,171 A | 6/1971 | Otter | |
| 3,637,078 A | 1/1972 | Hollar | |
| 3,722,691 A | 3/1973 | Francois | |
| 3,975,273 A | 8/1976 | Shaltz et al. | |
| 4,107,048 A | 8/1978 | Darash | |
| 4,141,700 A | 2/1979 | Norton, Jr. et al. | |
| 4,162,905 A | 7/1979 | Schuler | |
| 4,372,762 A | 2/1983 | Cooley | |
| 4,422,938 A | 12/1983 | Miller | |
| 4,427,547 A | 1/1984 | Miller et al. | |
| 4,655,914 A | 4/1987 | Wada | |
| 4,780,203 A | 10/1988 | Barcy | |
| 4,802,979 A | 2/1989 | Medley, III | |
| 4,885,082 A | 12/1989 | Cantoni | |
| 4,997,558 A | 3/1991 | Yano et al. | |
| 5,447,627 A | 9/1995 | Loafman et al. | |
| 5,569,373 A | 10/1996 | Smith et al. | |
| 5,695,637 A | 12/1997 | Jiang et al. | |
| 5,785,850 A | 7/1998 | Lynch et al. | |

*Primary Examiner*—David A Reifsnyder
(74) *Attorney, Agent, or Firm*—Millen, White, Zelano & Branigan, P.C.

(57) ABSTRACT

A filter for filtering a fluid, such as lubricating oil for an engine, has a first element for trapping small particles and a second filter element for trapping sludge, the second filter element being stacked on the first filter element. A flow-deflecting element is disposed between the first filter element and second filter element to provide a spinning motion to oil flowing from the second filter element as that oil joins oil which is passed through the first filter element. The spinning motion of the oil from the bypass filter element encourages mixing of the oil from the second filter element with the oil filtered by the first element. A centrifugal separator is disposed in an annular space between the filter elements and filter housing for imparting a rotary motion to the fluid prior to the fluid passing through the filter elements. This removes large particles from the fluid by centrifugal force so that large particles do not add to the contaminant load in the filter elements. During operation of the engine, this arrangement tends to provide cleaner lubricating oil, and therefore reduces engine wear while increasing the time interval between scheduled maintenance procedures.

23 Claims, 4 Drawing Sheets

DUAL FILTER WITH FLOW MIXER AND CENTRIFUGAL SEPARATOR

Related Patent Applications

This application is a continuation-in-part of both U.S. patent application Ser. No. 09/474,061, filed on Dec. 29, 1999, now U.S. Pat. 6,350,379 and U.S. patent application Ser. No. 09/398,459, filed on Sep. 17, 1999, now U.S. Pat. No. 6,423,225.

FIELD OF THE INVENTION

The present invention relates to dual filters having a full flow filter element and a bypass filter element. More particularly, the present invention relates to a dual filter having a full flow filter element and a bypass filter element arranged in tandem with auxiliary structure which enhance filtering function.

BACKGROUND OF THE INVENTION

Filter cartridges used for filtering fluids such as lubricating oil can be arranged with a full flow filter element and a bypass filter element, the bypass filter element being stacked on the full flow filter element with the fluid flowing radially through the filter elements into hollow cores thereof and then axially out of the canister.

This arrangement is widely employed to filter lubricating oil used in internal combustion engines. Engine wear, specifically piston ring wear, is directly related to the amount of actual filtration of lubricating oil by both full flow and bypass filters which is mixed after filtration. It has been found that by combining filtration provided by a full flow filter element with that of a bypass filter element substantially reduces engine wear as compared to using only full flow filtration. Moreover, by using a combination of full flow and bypass flow lubricating oil, service intervals can be increased so that maintenance expense is reduced. Maintenance expense is a major consideration in the total expense of operating a vehicle. This is, of course, a major concern for fleets of vehicles, such as the fleets operated by trucking companies. In addition, by keeping lubricating oil clean, it can remain in engines longer and does not have to be recycled at shorter intervals. Consequently, environmental concerns due to vast amounts of used lubricating oil are reduced because less used oil must be recycled. It is therefore beneficial to enhance the performance of lubricating oil cartridges which utilize both full flow filter elements and bypass filter elements.

SUMMARY OF THE INVENTION

In view of the aforementioned considerations, it is a feature of the present invention to provide a filter for removing particles from a fluid wherein the filter comprises a canister having a first end with radially disposed inlet openings and a central outlet opening and having a second end which is closed. A first filter element having a small particle annular filter media defining a first substantially cylindrical hollow core is disposed adjacent the first end of the canister. A second filter element having a sludge removing annular filter media defining a second substantially cylindrical hollow core is stacked axially with respect to the first filter element. A flow mixing element connects the second hollow core to the first hollow core and includes a flow deflector which imparts a rotational component to the fluid as the fluid flows axially from the first hollow core to the second hollow core. Consequently, fluid flowing radially through the small particle filter media mixes with the rotating fluid which has been filtered by the second filter media before passing through the central outlet opening of the filter canister. The capacity of the filter is increased by providing an array of angled fins which impart rotation to the fluid around the filter elements after the fluid enters the canister and flows toward the second end of the canister.

In another aspect of the invention, the flow mixing element comprises an annular channel formed about a core, the annular channel having a flow deflector therein, which in a more specific aspect of the invention comprises at least one axially-extending angularly displaced rib.

In a further aspect of the invention, the afore-described rib extends across the annular channel and supports the core of the mixing element therein. In a more specific aspect, the core has at least one end which is closed to the passage of fluid so that the fluid flows from the second hollow core to the first hollow core only through the annular channel.

In still further aspects of the invention, the filter is arranged with the first filter element disposed above the second filter element and with a chamber within the canister below the second filter element for accumulating particles separated from the fluid by centrifugal force to keep those particles out of the filter elements.

In a specific embodiment, the aforedescribed filter is used to filter lubricating oil for internal combustion engines.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein.

DETAILED DESCRIPTION

Figure 1:
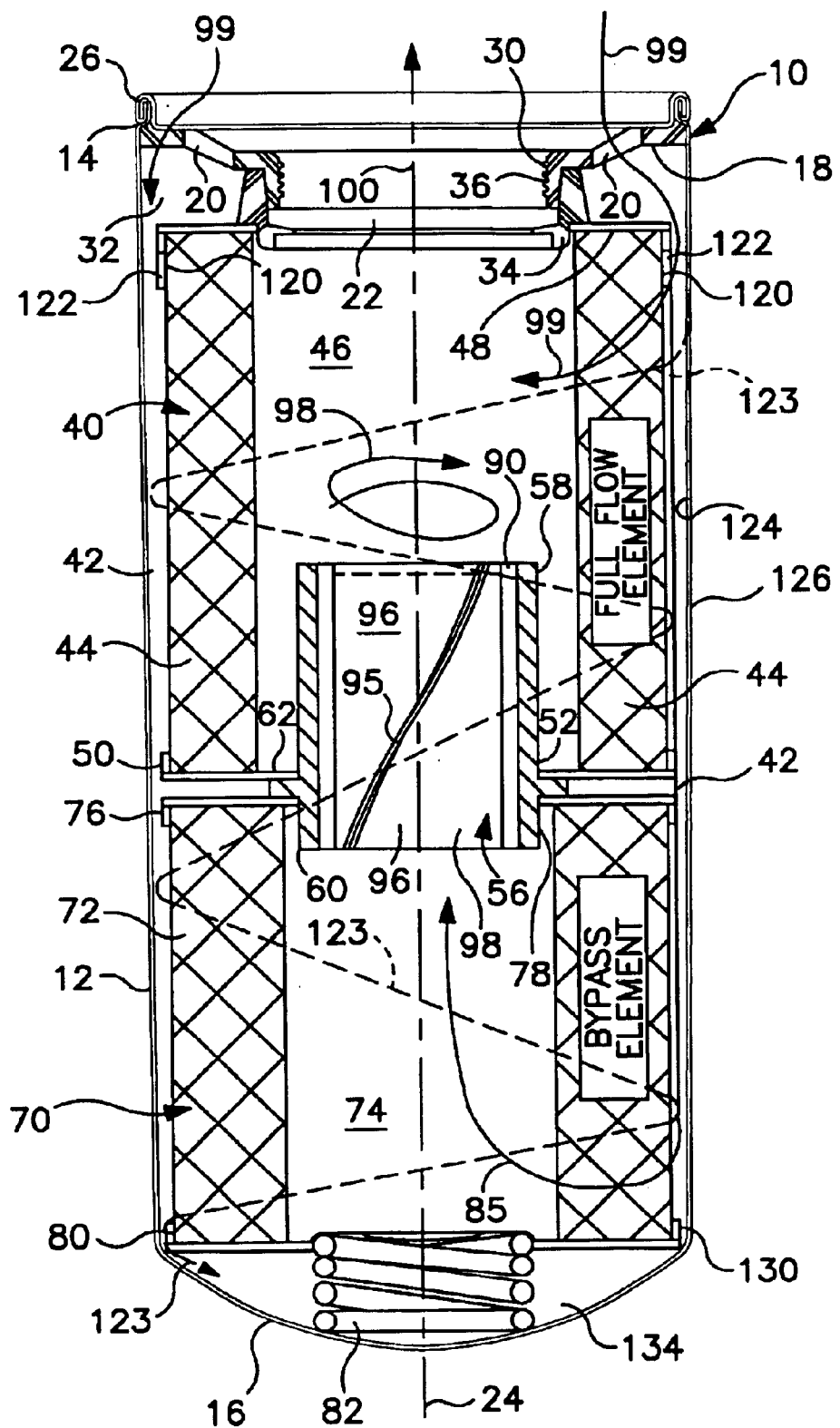
FIG. 1 is a side elevation, of a filter configured in accordance with the principles of the present invention.

Referring now to FIG. 1, there is shown a filter cartridge 10, configured in accordance with the principles of the present invention, wherein the filter cartridge 10 includes a canister housing 12 having a first end 14 and a second end 16 which is formed. The first end 14 includes an end plate 18 which has a plurality of radially-spaced inlet openings 20 and a central axial opening 22 which is coaxial with an axis 24 of the filter canister. The end plate 18 is retained at the first end 14 and within the canister 12 by a crimped retaining arrangement 26. Preferably, the filter cartridge 10 is mounted with the axis extending at least generally vertically and the first 14 being the top end and second end 16 being the bottom end.

The canister 12 is configured in accordance with a preferred embodiment of the invention as a filter canister for filtering lubricating oil used in internal combustion engines wherein the central outlet 22 has internal threads 30 which are threaded onto a hollow stud (not shown) projecting from an engine (not shown) to allow filtered oil to return to the engine. The plurality of radially spaced inlet openings 20 are isolated from the stud and allow lubricating oil to flow into an annular space 32 which is defined by a filter element support 34 that rests on the inner surface of the end plate 18 and surrounds a collar 36 which has the thread 30 on the inner surface thereof.

Urged against the filter element support 34 is a first filter element 40 which is a full flow filter element. The first filter element 40 has a diameter less than the diameter of the housing 12 so that a gap providing an annular inlet channel 42 is created between the filter element 40 and the inner surface of the wall of the canister 12. The first filter element 40 is comprised of an annular small particle filter media 44 having a first hollow core 46 therein and having first and second ends closed by first and second end caps 48 and 50. The first end cap 48 is urged against the annular support 34, while the second end cap 50 is annular defining a hole 52 therethrough, which hole receives a first flow-deflecting element 56 disposed internally with respect to the filter elements 40 and 70. The first flow deflecting element 56 has a first end 58 that projects into the first hollow core 46 and a second end 60 which projects and below the first filter element 40 to impact a non-axial component to fluid flowing out of the filter media 44. The flow 56 has a radially projecting flange 62 which rests on the flange 50 so as to be sandwiched between the first filter element 40 and a second filter element 70.

The second filter element 70 which is stacked beneath the first filter element 40 has a portion of the annular inlet channel 42 therearound and has an annular sludge removing filter media 72 which defines therein a second hollow core 74, which second hollow core 74 communicates with the first hollow core 46 through the flow-altering element 56. The second filter element 70 has a first end closed by a first annular end cap 76 which has an opening 78 therethrough which receives the second end 60 of the flow-altering element 56 and abuts the top surface of the radial flange 62 so as to clamp the flow-altering element in place with the second end 60 of the flow-altering element received within the hollow core 74 of the first annular filter media 72. At the second end of the sludge removing filter media 72 is a second end cap 80 which is configured as a closed disk without a center opening. The second end cap 80 is engaged by a coil spring 82 which abuts the closed second end 16 of the canister 12 to urge the second filter element 70 against the radial flange 62 of the flow-deflecting element 56 that in turn abuts the first filter element 40 and holds the first filter element against the filter element support 34.

Dirty lubricating oil 85 flowing in the annular inlet channel 42 which does not flow radially through the first filter media 44 flows radially through the second filter media 72 and then through the first flow-deflecting element 56.

Figure 2:
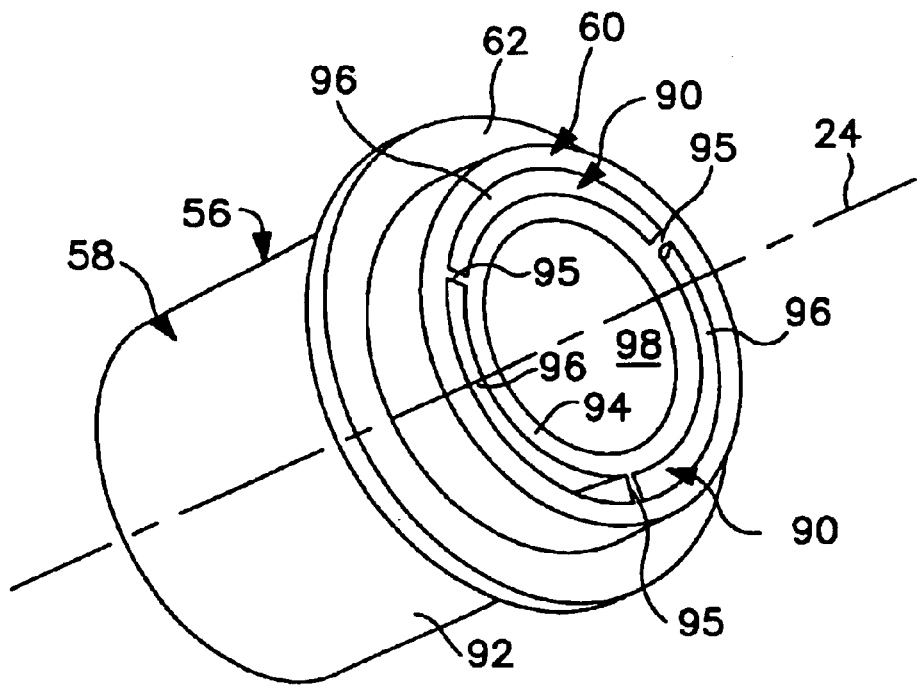
FIG. 2 is a perspective view of a flow-altering element utilized with the cartridge of FIG. 1.
Figure 3:
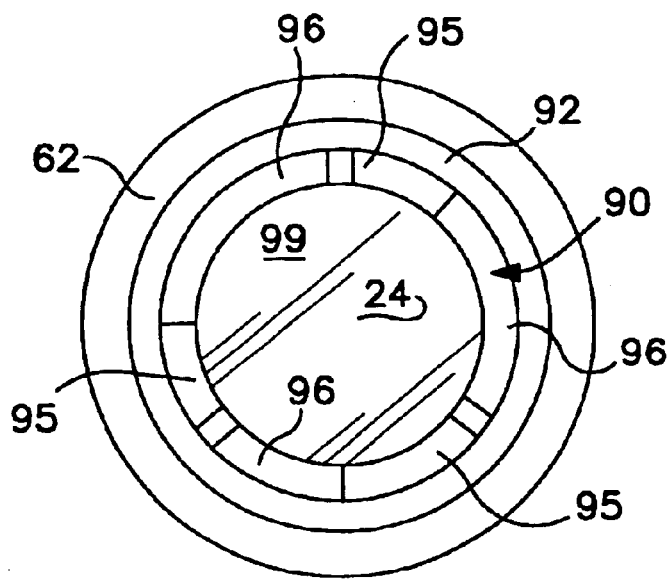
FIG. 3 is a bottom view of the flow control element of FIG. 2.

Referring now to FIGS. 2 and 3 in combination with FIG. 1, the first flow-deflecting element 56 is configured as a cylindrical insert with an annular channel 90 disposed between an outer cylindrical sleeve 92 and an inner cylindrical sleeve 94. The outer sleeve 92 and the inner sleeve 94 are held in space with respect to one another by at least one rib 95. Preferably, there are three ribs 95 which extend between the inner circular sleeve 94 and outer circular sleeve 92 so that the annular channel 90 is divided into three circumferentially-spaced channels 96. As is seen in FIG. 1, the three ribs 95 extend axially in the direction of the axis 24 but are angularly spaced with respect to the axis as the ribs 95 progress from the second end 60 of the flow-deflecting element to the first end 58 thereof. Each of the channels 96 are deflected in the same direction. Consequently, as the fluid flows through the channels 96, it is given an angular component and therefore emerges from the end 58 of the flow-deflecting element so as to impart a spiraling motion to the fluid indicated by the arrow 98.

The spiraling fluid 98 mixes with fluid 99 which has passed radially through the first filter media 44 and then changes direction and flows axially out of the outlet 22. The resulting fluid stream 100 flowing out of the outlet 22 is therefore a mixture of this fluid 98 and the fluid 99.

The aforedescribed arrangement is especially useful with lubricating oil filters wherein the first filter element 40 is a full flow filter element and the second filter element 72 is a bypass filter element. It has been found desirable to mix the lubricating oil which has been filtered by the bypass filter element 72 with the filter oil filtered by the full flow filter element 40 before returning the oil to the engine in the flow stream 100 passing through the outlet 22. This arrangement is especially useful when the second filter element 72 which forms the bypass element is arranged for recycling sludge generated by the internal combustion engine while the full flow filter element 40 traps only particles or dirt. Consequently, as the oil stream undergoes many passes through the filter cartridge 10, the first filter element 40 traps primarily dirt or particulate matter in the filter media 44, while the second filter element 70 traps primarily sludge in the second filter media 72. Thus, the first filter media 44 has an increased dirt-holding capacity because it does not also trap sludge, thereby rendering the entire filtering system provided within the cartridge 10 with an increased capacity and efficiency that improves lubricating oil filtration and substantially increases the interval between oil filter changes.

The inner sleeve 94 provides a hollow core 98 which has adjacent the end 90 an end wall 99 so that the fluid flowing radially through the second filter media 72 of the second filter element 70 is forced to pass through the channels 97 of the annular channel 60. Most of the fluid tends to flow into the hollow core 98 which forms a cup that helps retain contaminants which have passed through the filter media 72 of the second filter element 70.

In order to further increase capacity and efficiency of the filter cartridge 10, an external array 120 of fins 122 provides a second deflector in the form of a centrifugal separator which is positioned in the gap providing the annular inlet channel 42 just down stream of the inlet openings 20 adjacent to the first end cap 48. The array 120 of fins 122 imparts a rotational motion to the fluid 99 prior to the fluid entering the first filter element 40 so that the fluid spirals in the direction of arrows 123 around the first filter element causing relatively large particles to migrate centrifugally toward the inner surface 124 of the cylindrical wall 126 comprising the housing 12 instead of passing through the small particle filter media 44 of the first filter element 40. Accordingly, it is mostly smaller particles of dirt or contaminant that pass through the first filter element 40.

The fluid continues to spiral as it moves in the gap providing the annular inlet channel 42 toward the second filter element 70, keeping a substantial quantity of large particles away from the second filter element so that the second filter element mainly traps sludge in the sludge removing filter media 72, a substantial portion of the large particles remaining suspended in the oil near the surface 124 of the canister wall 126 and never passing into the second filter element 70.

The large particles which have avoided filter elements 40 and 70 pass through an end gap 130 between the end cap 80 of the second filter element 70 and the surface 124 of wall 126. The particles then become trapped in a chamber 134 defined by the domed second end 16 of the housing 12. The end gap 130 is maintained by the spring 82 which urges the second filter element 70 against flange 62 of the flow deflecting element 56 which in turn abuts the first filter element 40 to urge the first filter element against the filter element support 34. Since the chamber 134 is beneath the second filter element 70, the heavy particles settle out and accumulate against the inner surface of the domed end 16.

Figure 4:
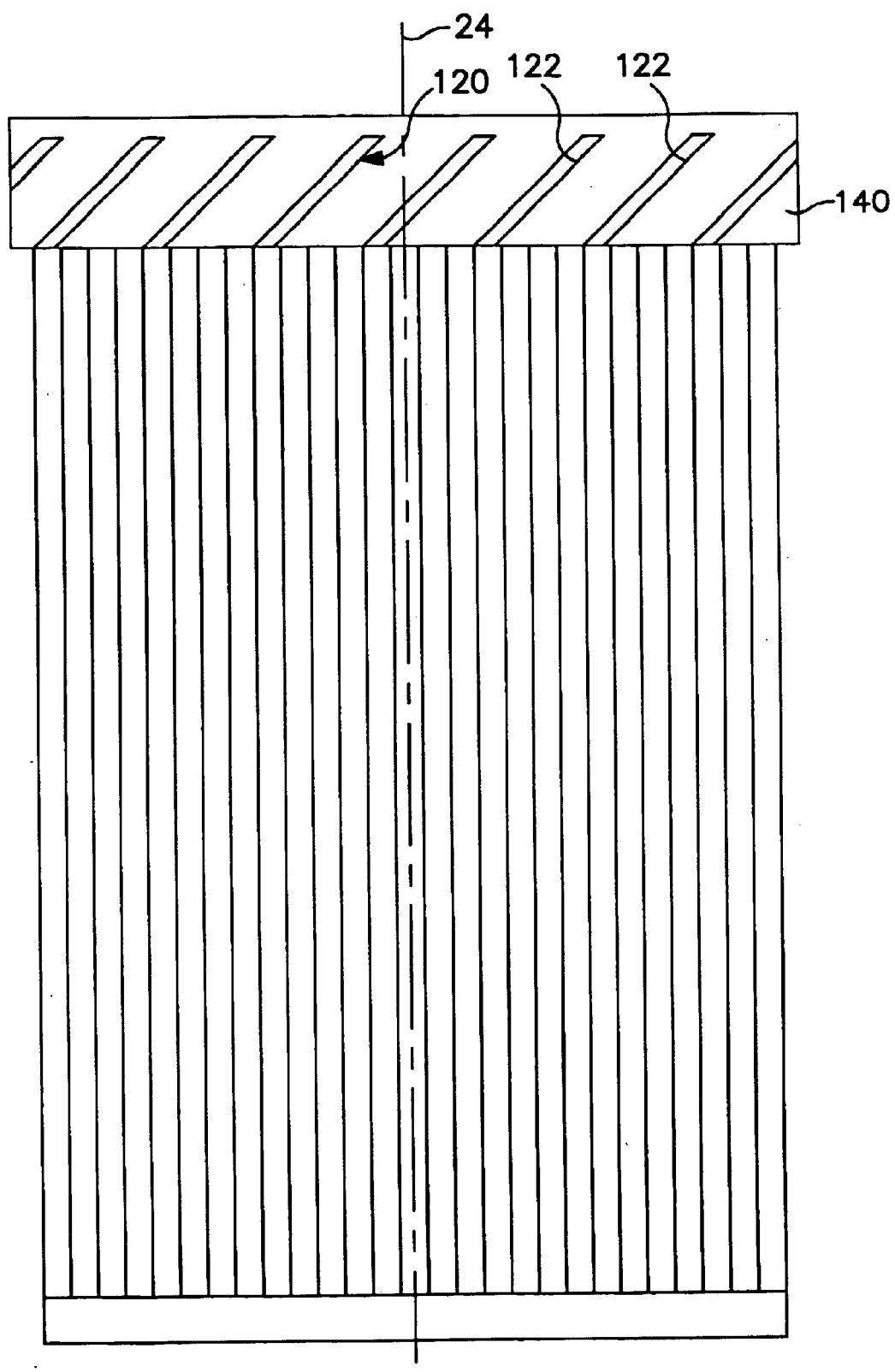
FIG. 4 is a side view of a filter element having attached thereto a fin array ring.
Figure 5:
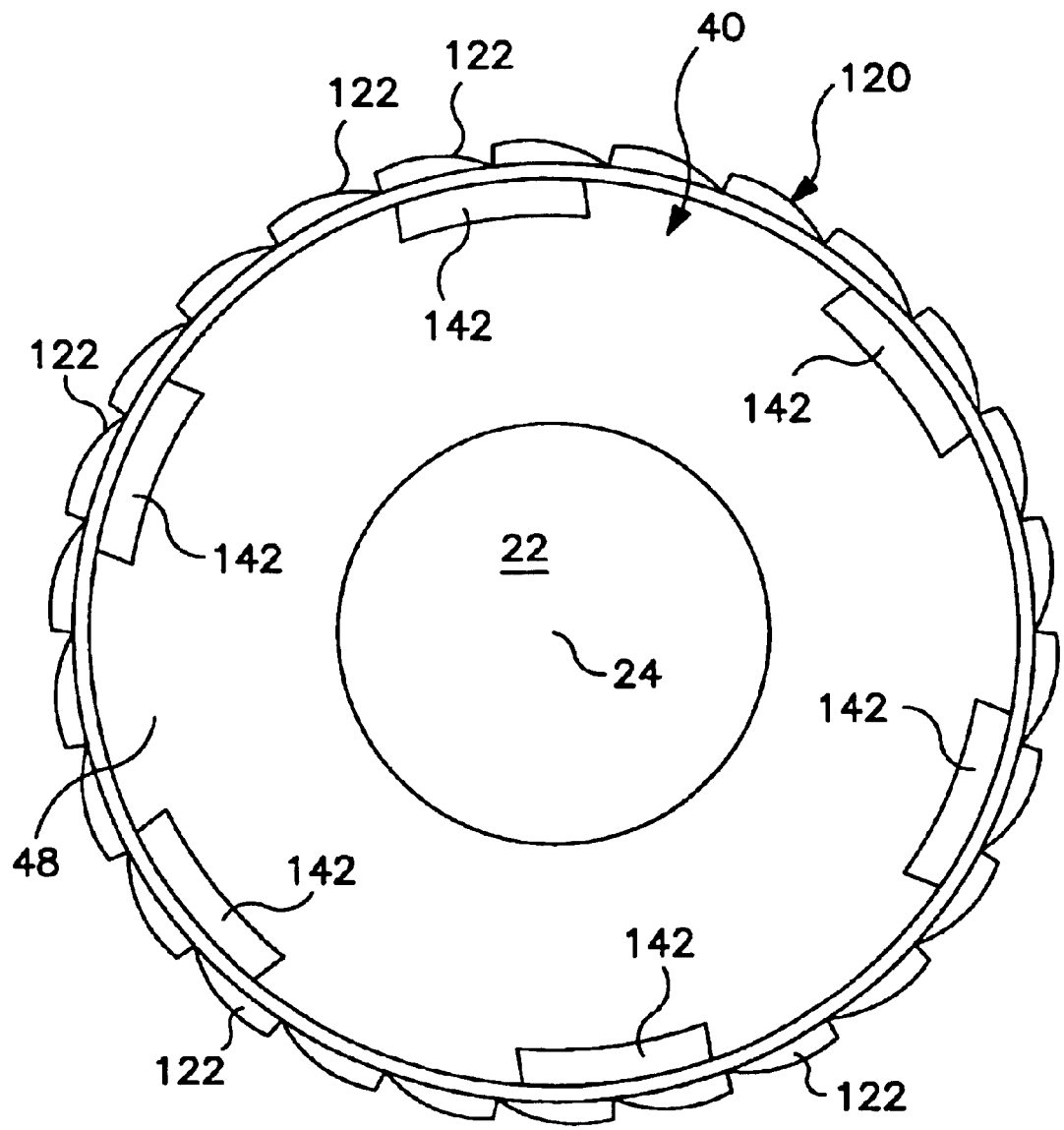
FIG. 5 is an end view of the filter element of FIG. 4 with the fin array ring attached.

As is seen in FIGS. 4 and 5, the array 120 fins 122 is preferably unitary with an annular band 140, the fins being disposed at an angle of approximately 45° with respect to the axis 24 of the filter canister 10. The annular band 140 has a plurality of inwardly projecting tabs 142 which extend radially over and engage the first end cap 48 in order to retain the array 122 of fins 120 adjacent to the first end cap 48 at the top of the first filter element 40.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A filter arrangement for filtering lubricating oil wherein the lubricating oil contains contaminants in the form of small particles, large particles and sludge, the filter arrangement comprising:

a first annular filter element having a top and a bottom and a filter media with a dirty side and a clean side for filtering relatively small particles from the lubricating oil, the first filter element having a first hollow core;

a second annular filter element having a filter media with a dirty side and a clean side for removing sludge from the lubricating oil, the second filter element being located beneath the first filter element and having a second hollow core;

a centrifugal separator coaxial with the filter elements for removing large particles from the lubricating oil prior to the lubricating oil entering the dirty sides of the first and second filter elements, the centrifugal separator being disposed adjacent to the top of the first filter element, a flow deflector element having an inlet in the hollow core of the second filter element and an outlet in the hollow core of the first filter element, the flow deflector imparting a spiraling motion to the lubricating oil filtered by the second as the lubricating oil enters the hollow core of the first filter element to mix with the lubricating oil filtered by the first filter element, and a canister for containing the first and second filter elements and the centrifugal separator.

2. The filter arrangement of claim 1 wherein the centrifugal separator is configured as an array of fins disposed in an annular space between the filter elements and canister.

3. A filter for filtering a fluid comprising:

a canister having a first end with radially positioned inlet openings and a central opening disposed about a central axis, the canister having a closed second end;

a first filter element having a first annular filter media defining a first substantially cylindrical hollow core, the first filter element being disposed adjacent the first end of the canister housing;

a second filter element having second annular filter media defining a second substantially cylindrical hollow core, the second filter element being stacked axially beneath the first filter element;

the first and second filter elements being radially spaced from the housing wall to define an annular space, and a flow deflecting element connecting the second hollow core to the first hollow core, the flow deflecting element comprising a flow deflector which imparts a spiraling motion to the fluid filtered by the second filter element as the fluid flows axially from the first hollow core to the second hollow core wherein fluid flowing radially through the first filter media mixes with the spiraling fluid which has been filtered by the second filter media before passing axially through the outlet of the filter cartridge.

4. The filter of claim 3, wherein the flow deflecting element comprises an annular channel formed about a core, the annular channel having the flow deflector therein.

5. The filter of claim 4, wherein the first flow deflector comprises at least one axially extending angularly displaced rib.

6. The filter of claim 5, wherein the rib extends across the annular channel and supports the core therein.

7. The filter of claim 6, wherein the core has at least one end closed to axial passage of fluid.

8. The filter of claim 5, wherein the core is hollow and has a first dosed end and a second open end, the open end being in the second hollow core defined by the second annular filter element.

9. The filter of claim 3 further including a centrifugal separator on the dean sides of the first and second filter elements.

10. The filter of claim 9 wherein the centrifugal separator comprises an array of fins is disposed at the first filter adjacent to the first end of the canister.

11. The filter of claim 10 wherein the array of fins are disposed on a plastic ring which fits around the first filter.

12. The filter of claim 3 wherein the fluid is engine lubricating oil having small particles, large particles and sludge entrained therein, and wherein the small particles are filtered out by the first filter element, the large particles are precipitated out by the centrifugal separator, and the sludge filtered out by the second filter element.

13. A filter cartridge for filtering a fluid comprising:

a canister formed about a longitudinal axis and having a first end with radially-disposed inlet openings and a centrally-disposed outlet opening, the canister having a closed second end;

a first filter element having a first annular filter media defining a first substantially cylindrical hollow core communicating directly with the outlet opening, the first filter element being disposed adjacent the first end of the canister and being radially spaced from the canister by an annular gap;

a second filter element having second annular filter media defining a second substantially cylindrical hollow core, the second filter element being stacked axially beneath the first filter element with the second hollow core communicating only with the first hollow core, and the second filter element being radially spaced from the canister by the annular gap;

a centrifugal separator disposed in the annular gap for imparting a rotational component to the fluid about the axis of the canister as the fluid enters the annular gap and flows in the annular gap toward the closed second end of the canister to remove contaminates from the fluid; and a flow deflecting element directly connecting the second hollow core to the first hollow core, the flow deflecting element comprising a flow deflector which imparts a spiraling motion to the fluid at a location where the fluid flows axially from the first hollow core into the second hollow core; whereby before passing the axially through the outlet of the filter cartridge, fluid flowing radially through the first filter media mixes with spiraling fluid which has been filtered by the second filter media and has passed through the flow deflecting element.

14. The filter element of claim 13 wherein the second flow detector is an annular array of canted fins disposed around the first filter element and extending into the annular gap.

15. The filter of claim 13 wherein the first and second filter elements are annular with the first filter element being stacked above the second filter element and wherein the flow deflecting element is disposed upstream of at least a majority of the filter media of the first filter element.

16. The filter of claim 15 further including a flow deflecting element for imparting a non-axial component to filtered lubricating oil flowing from the clean side of the first filter element down past the clean side of the second filter element to mix with filtered lubricating oil from the first filter element.

17. The filter of claim 16 wherein the centrifugal separator is configured as an array of fins disposed in the annular space between the filter elements and canister housing.

18. A filter cartridge for filtering lubricating oil comprising:

a canister formed about a longitudinal axis and having a first end with radially-disposed inlet openings and a centrally-disposed outlet opening, the canister having a closed second end;

a first filter element having a first annular filter media defining a first substantially cylindrical hollow core communicating directly with the outlet opening and selected for primarily removing particulates, the first filter element being disposed adjacent the first end of the canister and being spaced radially from the canister by an annular gap;

a second filter element having second annular filter media defining a second substantially cylindrical hollow core and selected for primarily removing sludge, the second filter element being stacked axially beneath the first filter element with the second hollow core communicating only with the first hollow core, the second filter element being radially spaced from the canister by an annular gap;

a centrifugal separator disposed in the annular gap for imparting a rotational component to the lubricating oil as the lubricating oil flows down the gap;

a flow deflecting element directly connecting the second hollow core to the first hollow core, the flow deflecting element comprising a flow deflector within an annular channel formed about a central closed core, which flow deflector imparts spiral motion to the lubricating oil at a location where the lubricating oil flows axially from the second hollow core into the first hollow core, whereby before passing axially though the outlet of the filter cartridge, lubricating oil flowing radially through the first filter media mixes with spiraling lubricating oil which has been filtered by the second filter media and is passed through the flow deflecting element.

19. The filter element of claim 18 wherein the centrifugal separator is an annular array of canted fins disposed around the first filter element and extending into the annular gap.

20. The filter of claim 18, wherein the flow deflecting element comprises an annular channel formed about a core, the annular channel having the flow detector therein.

21. The filter of claim 20, wherein the flow deflector comprises at least one axially extending angularly displaced rib.

22. The filter of claim 21, wherein the rib extends across the annular channel and supports the core therein.

23. The filter of claim 18, wherein the core has at least one end closed to axial passage of fluid.

* * * * *